(12) United States Patent
Ma et al.

(10) Patent No.: US 7,729,361 B2
(45) Date of Patent: Jun. 1, 2010

(54) METHOD AND SYSTEM FOR POWER-EFFICIENT ADAPTIVE LINK AGGREGATION

(75) Inventors: Kevin J. Ma, Nashua, NH (US); Lance Alan McCallum, Nashua, NH (US); Brenda J. Thompson, Hollis, NH (US)

(73) Assignee: Cisco Technology, Inc., San Jose, CA (US)

( * ) Notice: Subject to any disclaimer, the term of this patent is extended or adjusted under 35 U.S.C. 154(b) by 900 days.

(21) Appl. No.: 11/361,448

(22) Filed: Feb. 24, 2006

(65) Prior Publication Data

US 2007/0201380 A1    Aug. 30, 2007

(51) Int. Cl.
*H04L 12/28* (2006.01)
(52) U.S. Cl. .................................. 370/400
(58) Field of Classification Search ............. 370/254, 370/400; 709/220
See application file for complete search history.

(56) References Cited

U.S. PATENT DOCUMENTS

| | | | |
|---|---|---|---|
| 6,298,061 B1 * | 10/2001 | Chin et al. ............... | 370/400 |
| 6,687,758 B2 * | 2/2004 | Craft et al. .............. | 709/250 |
| 6,910,149 B2 | 6/2005 | Perloff et al. | |
| 6,920,141 B1 | 7/2005 | Gupta et al. | |
| 6,934,293 B1 * | 8/2005 | DeJager et al. ............ | 370/401 |
| 6,938,092 B2 | 8/2005 | Burns | |
| 6,941,252 B2 | 9/2005 | Nelson et al. | |
| 2005/0021697 A1 * | 1/2005 | Hunt et al. ............... | 709/220 |

OTHER PUBLICATIONS

Norman Finn, "Port Aggression Protocol", 27 pages, Cisco Systems, Inc. May 1, 1998.

* cited by examiner

*Primary Examiner*—Ayaz R Sheikh
*Assistant Examiner*—Hai-Chang Hsiung
(74) *Attorney, Agent, or Firm*—Trellis IP Law Group, PC (57) ABSTRACT

A method for power-efficient configuration of one or more physical ports at a network device in an EtherChannel is provided. Parameters for allocation of the physical ports to a logical port are negotiated with a link partner. Thereafter, bandwidth load at the logical port is compared with the parameter. The physical ports are configured, based on the comparison.

22 Claims, 8 Drawing Sheets

METHOD AND SYSTEM FOR POWER-EFFICIENT ADAPTIVE LINK AGGREGATION

BACKGROUND OF THE INVENTION

1. Field of Invention

Embodiments of the invention relate, in general, to networking and more specifically, the embodiments of the invention relate to a method and a system for efficient power management in an EtherChannel.

2. Description of the Background Art

Computer networks include personal computers, workstations, routers, switches and other network infrastructure devices. Network infrastructure devices are interconnected by a medium such as network cables for transmitting data packets through physical ports. Physical ports are the connection points for the network cables and the network infrastructure devices. A physical port can include 9 pins, 25 pins, 36 pins and so forth.

A stream of data packets is transmitted through the physical ports of different network devices. The network infrastructure devices can encounter a large inflow or outflow of these streams of data packets. In this case, the data packets are stranded in a queue at a physical port of the network infrastructure device before being forwarded to a network device in the network.

To avoid the stranding of the data packets, an existing method uses a logical grouping of multiple physical ports into a logical port. This logical grouping increases the bandwidth of a data transmission channel. The logical port has multiple links that connect the network infrastructure device and the network device. Each multiple link is capable of carrying data at the same rate as the link that is connecting data packet source device to the network infrastructure device. This grouping of physical ports is sometimes referred to as port aggregation. One example of such port aggregation implementation is Cisco Technology, Inc.'s Fast EtherChannel™ port group in a Fast Ethernet network.

In an EtherChannel (or port channel), load sharing is statically configured. In statically configured channel, each port is assigned a source address, a destination address or both, in such a manner that all the physical ports in the port group are used. Using all physical ports at a low-load condition results in under utilization of the load capacity of the physical ports. Power is consumed for functioning of the physical ports, even when data packets are not passing through them. Therefore, keeping all the physical ports operational, where only a fraction of the physical ports could have catered the load requirements leads to unnecessary consumption of power.

DETAILED DESCRIPTION OF EMBODIMENTS OF THE INVENTION

Embodiments of the invention provide methods, systems, and computer-readable media for power-efficient configuration of one or more physical ports in an EtherChannel. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Embodiments of the invention provide methods and systems for power-efficient configuration of the physical ports at a switch in an EtherChannel. The physical ports include active physical ports that are actively involved in the transmission of data packets and standby physical ports that remain powered down during data transmission. The active physical ports are aggregated together into a logical port. The parameters for allocation of standby physical port to the logical port are negotiated with a link partner. Thereafter, the parameters are compared with the bandwidth load at the switch. Based on the comparison, the physical ports at the switch are configured. This configuration includes changing the standby physical ports to active physical ports when the active physical ports are not capable of handling the bandwidth load. During low-load conditions, the active physical ports are changed to standby physical ports.

Figure 1:
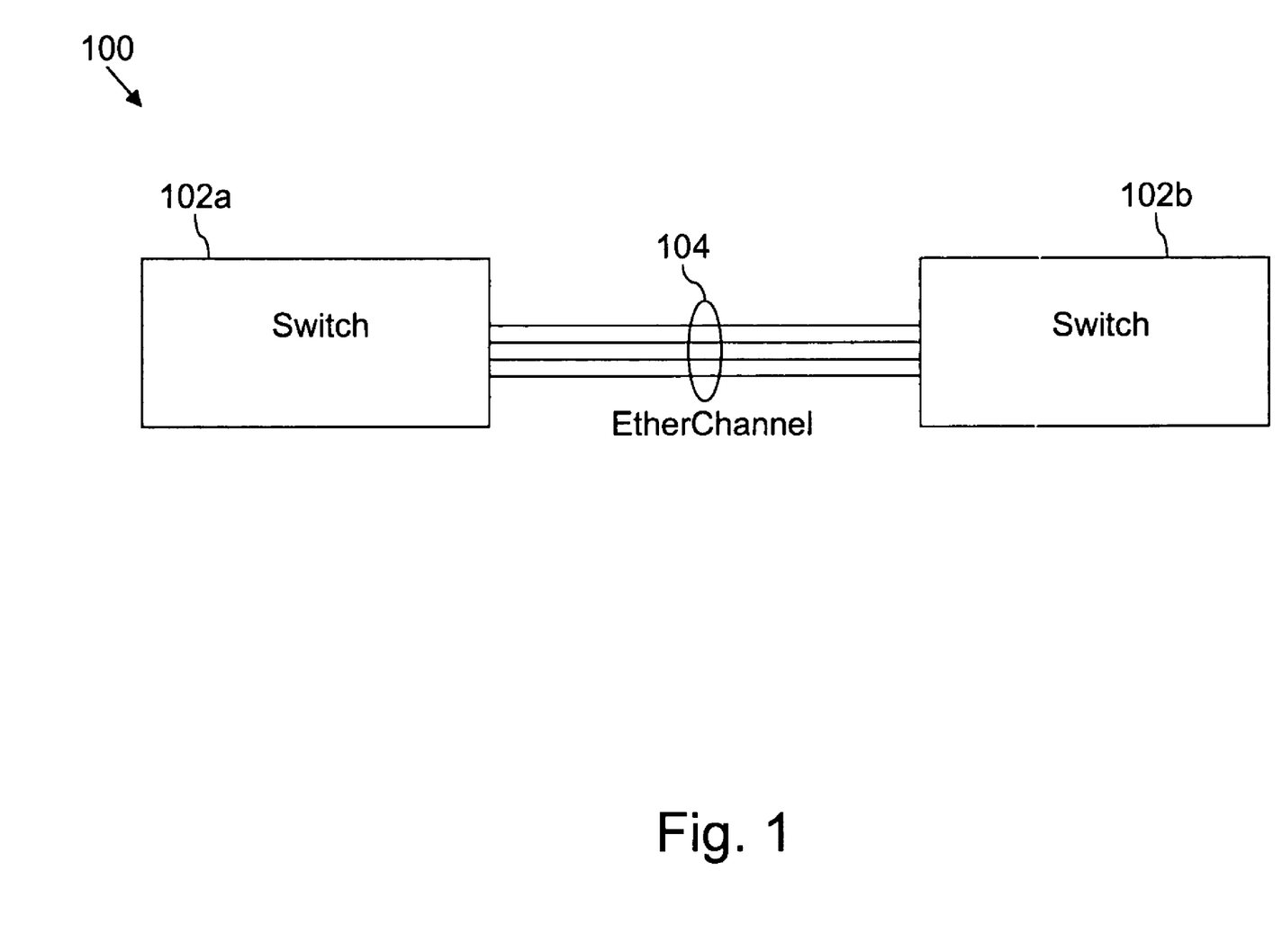
FIG. 1 illustrates an environment, wherein the embodiments of the present invention can be practiced.

Referring now to the drawings, more particularly by their reference numbers, FIG. 1 illustrates an environment 100, wherein the embodiments of the present invention can be practiced. Environment 100 includes network devices switch 102a and switch 102b, and EtherChannel 104. Switch 102a is a device that is capable of inspecting data packets as they are received, determining the source and destination device of the data packet, and appropriately forwarding the data packet. The source and destination device can be determined by using the Media Access Control (MAC) address, Internet Protocol (IP) address and so forth. In general, devices, communication links, protocols, data definitions and other characteristics can vary from those illustrated herein. For example, switch 102a can be a network device such as a network switch, a hub, a router, a server etc. Switch 102b, hereinafter referred to as link partner 102b, is a device with similar functionalities and form as switch 102a. EtherChannel 104 links switch 102a to link partner 102b. EtherChannel 104 is a transmission channel that enables bandwidth aggregation by grouping multiple Ethernet links with the same or differing speeds of data transmission into a single logical channel. Examples of EtherChannel 104 include Fast EtherChannel (FEC), Gigabit EtherChannel (GEC) and so forth. Each Ethernet link is connected to a physical port at switch 102a to a physical port at link partner 102b. The physical ports that participate in the transmission of data packets are known as active physical ports and are grouped together as a logical port. The physical ports that remain powered down during the transmission of data packets at switch 102a are known as standby physical ports. In a preferred embodiment of the present invention, EtherChannel 104 includes any number of Ethernet links.

Figure 2:
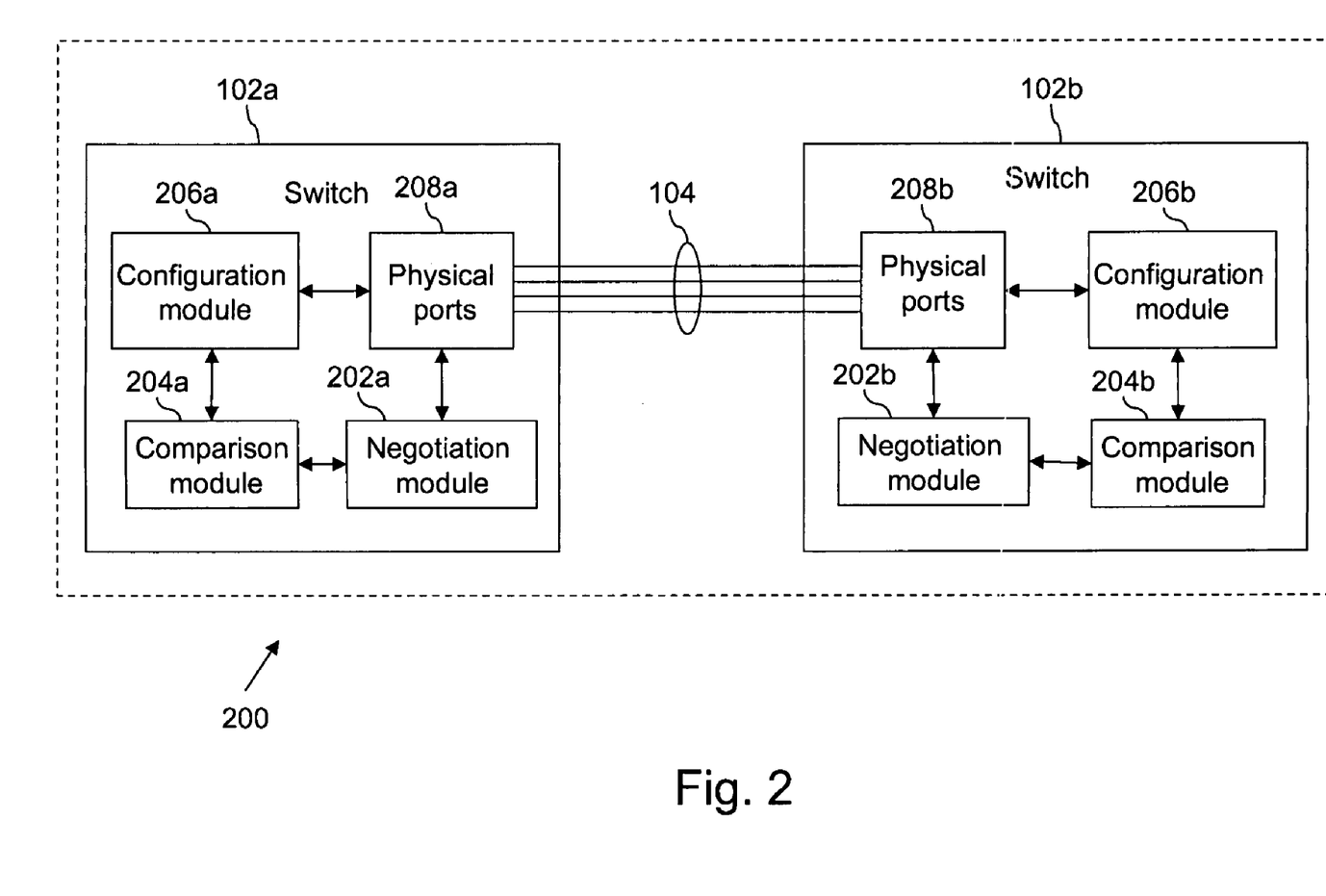
FIG. 2 is a block diagram of a system for power-efficient configuration of physical ports in an EtherChannel, in accordance with an exemplary embodiment of the present invention.

FIG. 2 is a block diagram of system 200 for power-efficient configuration of physical ports in an EtherChannel, in accordance with an exemplary embodiment of the present invention. System 200 includes switch 102a, link partner 102b and EtherChannel 104. Switch 102a includes negotiation module 202a, comparison module 204a, configuration module 206a, and one or more of physical ports 208a. Link partner 102b includes negotiation module 202b, comparison module 204b, configuration module 206b, and physical ports 208b. EtherChannel 104 connects physical ports 208a to physical port 208b. Negotiation module 202a negotiates the parameters for allocation of physical port 208a to the logical channel with link partner 102b. The parameters include an activation threshold, a removal threshold and a sequence for selecting one or more physical ports from physical port 208a at switch 102a. In various embodiments of the present invention, event-based parameters can be used that can help determine how a port is allocated. For example, the event-based parameters can be related to port failure, addition of a new network device, etc.

In a preferred embodiment of the present invention, parameters can be specified as default values so that not all of the parameters need be negotiated every time. For example, activation and removal thresholds can be predetermined for specific ranges or types of ports.

Negotiation module 202a receives one or more data packets from link partner 102b containing the values for the parameters. The values for the parameters are also calculated at negotiation module 202a. The values for the parameters received from link partner 102b and the values for the parameters calculated at negotiation module 202a are compared and then the final values of the parameters are decided. Thereafter, the final values of the parameters are sent to comparison module 204a. The final values include value for activation threshold, value for removal threshold and a sequence for selecting one or more physical ports from physical port 208a at switch 102a. Comparison module 204a compares the bandwidth load at physical port 208a with the value of activation threshold and the value of removal threshold. The comparison facilitates in determining the configuration that is capable of handling the bandwidth load with minimum power requirement. Configuration module 206a configures physical ports 208a based on the comparison.

The comparison can be a simple numerical comparison to determine whether a value representing the bandwidth load is higher or lower or equal to a value of a threshold. Other types of comparisons can be made including determining whether the values are within a specified range or relationship to each other. More complex comparisons can also be used such as varying comparison criteria over time or based on load conditions.

Figure 3:
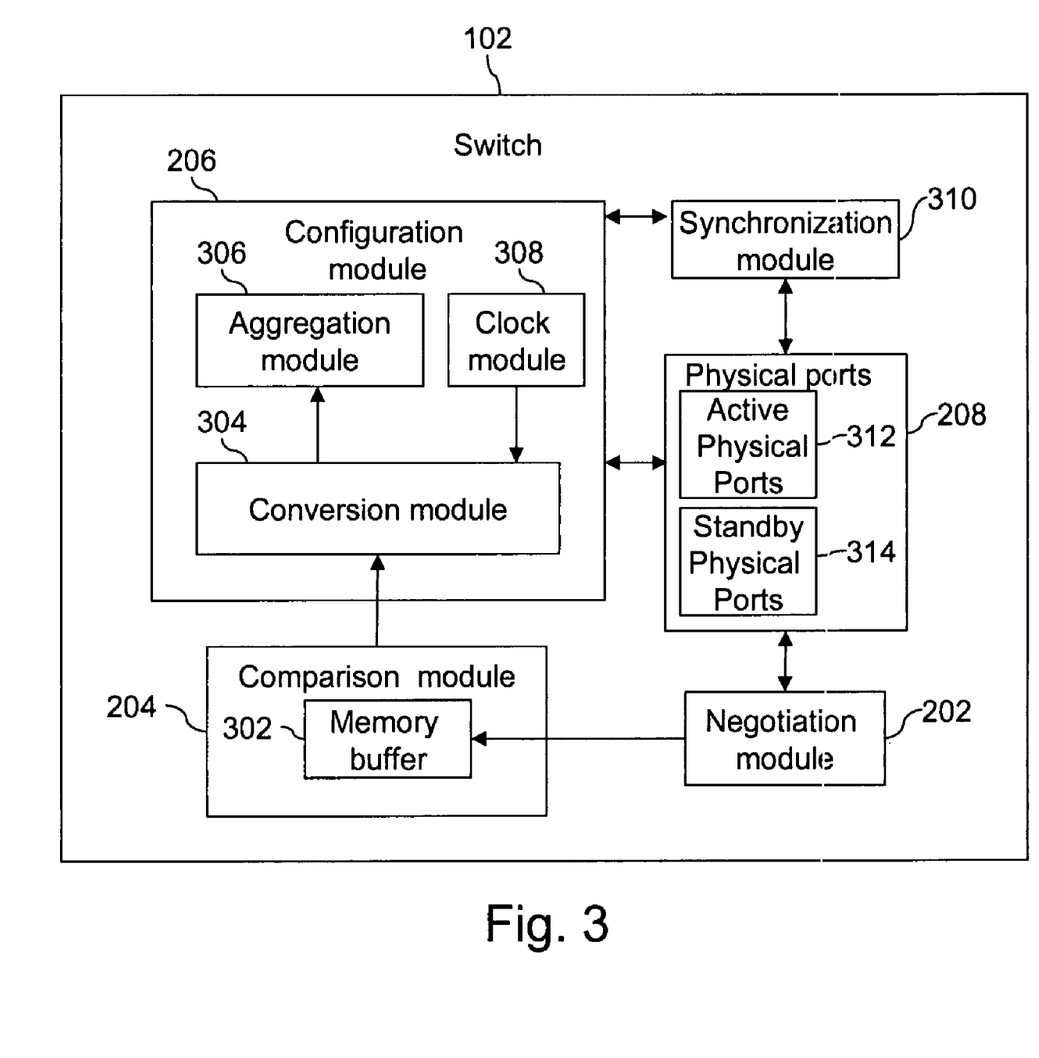
FIG. 3 is a block diagram of a system for power-efficient configuration of physical ports in an EtherChannel, in accordance with another exemplary embodiment of the present invention.

FIG. 3 is a block diagram of switch 102a for power-efficient configuration of physical ports in an EtherChannel, in accordance with another exemplary embodiment of the present invention. Switch 102a includes negotiation module 202, comparison module 204, configuration module 206, one or more of physical ports 208 and synchronization module 310. Negotiation module 202 negotiates the parameters for allocation of physical port 208 to the logical channel with link partner 102b. Physical port 208 comprises active physical ports 312 and standby physical ports 314. Active physical ports 312 together comprise a logical port. The parameters include an activation threshold, a removal threshold and a sequence for selecting one or more physical ports from physical ports 208 at switch 102a for conversion of active physical ports 312 to standby physical ports 314 and vice versa. The activation threshold is the bandwidth load for which one or more of standby physical ports need to be converted to active physical ports. The removal threshold is the bandwidth load for which active physical ports 312 need to be converted to standby physical ports 314. The sequence for selecting one or more physical ports from physical ports 208 at switch 102a is decided by using a hot standby prioritization scheme. In various embodiment of the present invention, the sequence is decided on basis of a latency metric, MAC address of standby physical ports 314, and a random distribution method.

Negotiation module 202 determines the value of activation threshold and the removal threshold for each of the active physical ports 312. The value of activation threshold is different for each one of active physical ports 312. In an embodiment of the present invention, the value of activation threshold is the same for all active physical ports 312. Moreover, the value of activation threshold is a percentage of the total bandwidth load for the logical port, normalized by the individual maximum capabilities of each of active physical ports 312. In various embodiments of the present invention, the value of activation threshold is the absolute load, absolute rate in bit per sec, absolute rate in frames per sec, etc. Similarly, the value of removal threshold for each one of active physical ports 312 is determined. Further, the sequence, the value of activation threshold, and the value of removal threshold are negotiated with link partner 102b. The negotiation includes selecting a lower value of activation threshold and selecting a higher value of removal threshold from the values received from link partner 102b and the values calculated at negotiation module 202. In an embodiment of the present invention, the negotiation also includes checking that the activation threshold is less than the removal threshold. The checking is performed to allow for hysteresis. Further, a final sequence is generated, based on hot standby prioritization scheme by negotiating module 202. The final values for the parameters are sent to comparison module 204 that includes memory buffer 302 that stores the final values for the parameter. Comparison module 204 calculates the bandwidth load at the logical port. Bandwidth load can be calculated as the ratio of the bandwidth being utilized for data transmission and the total bandwidth available in the data transmission channel at the active physical ports 312. Other measures of bandwidth load are possible such as a measure of a percentage utilization of the total available bandwidth at the physical ports 208, a localized measure pertaining to utilization of a link, utilization of buffers in a device or devices, etc. Moreover, comparison module 204 checks for stability of the bandwidth load for a predefined hold time. The checking for stability involves calculating moving average of the bandwidth load over the predefined hold time. The moving average is used as the bandwidth load. The predefined hold time represents the minimum time for utilization to stay above or below the activation or removal threshold. The predefined hold time includes an up-hold time and a down-hold time. An up-hold time is used when bandwidth load is greater than activation threshold and a down-hold time is used when bandwidth load is lesser than the removal threshold. The up-hold time is less than the down-hold time to realize a slower backing off and a faster start. Further, comparison module 204 compares the bandwidth load at the logical port with the value of activation threshold and the value of removal threshold.

Configuration module 206 includes conversion module 304, aggregation module 306 and clock module 308. Conversion module 304 converts standby physical ports 314 to active physical ports 312 if the bandwidth load at the logical port is greater than the activation threshold. Conversion module 304 converts active physical ports 312 to standby physical ports 314 if the bandwidth load at the logical port is lesser than the removal threshold. Clock module 308 checks that the conversion has taken place at conversion module 304. Clock module 308 includes an off-time for converting one or more of active physical ports 312 to one or more standby-physical ports 314 and an on-time for converting one or more of standby physical ports 314 to one or more active physical ports 312. If the conversion exceeds the off-time and the on-time, another port of physical ports 208 are selected for conversion. Thereafter, aggregation module 306 removes physical ports from the active pool 312 and places them into the standby pool 314 and allocates physical ports from the standby pool 314 to the active pool 312, of the logical port. Subsequently, synchronization module 310 synchronizes the activation threshold, the removal threshold, the sequence, the up-hold time and down-hold time, and clock module 308 at switch 102a with link partner 102b.

Figure 4:
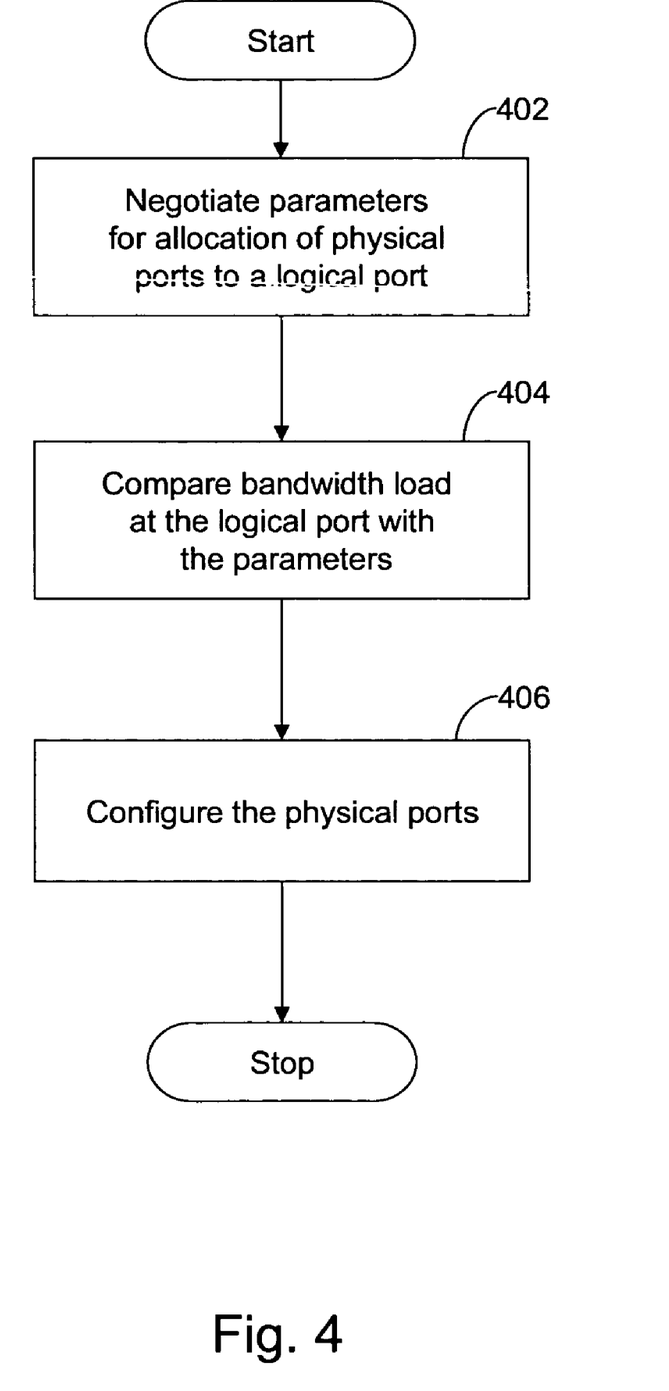
FIG. 4 is a flowchart of a method for power-efficient configuration of physical ports in an EtherChannel, in accordance with an exemplary embodiment of the present invention.

FIG. 4 is a flowchart of a method for power-efficient configuration of physical ports 208 in EtherChannel 104, in accordance with an exemplary embodiment of the present invention. At step 402, negotiating module 202 negotiates the parameters for allocation of physical ports 208 to a logical port at switch 102a with link partner 102b. Thereafter, at step 404, the bandwidth load at the logical port is compared with the parameters. At step 406, configuration module 204 configures physical ports 208, based on the comparison.

Figure 5A:
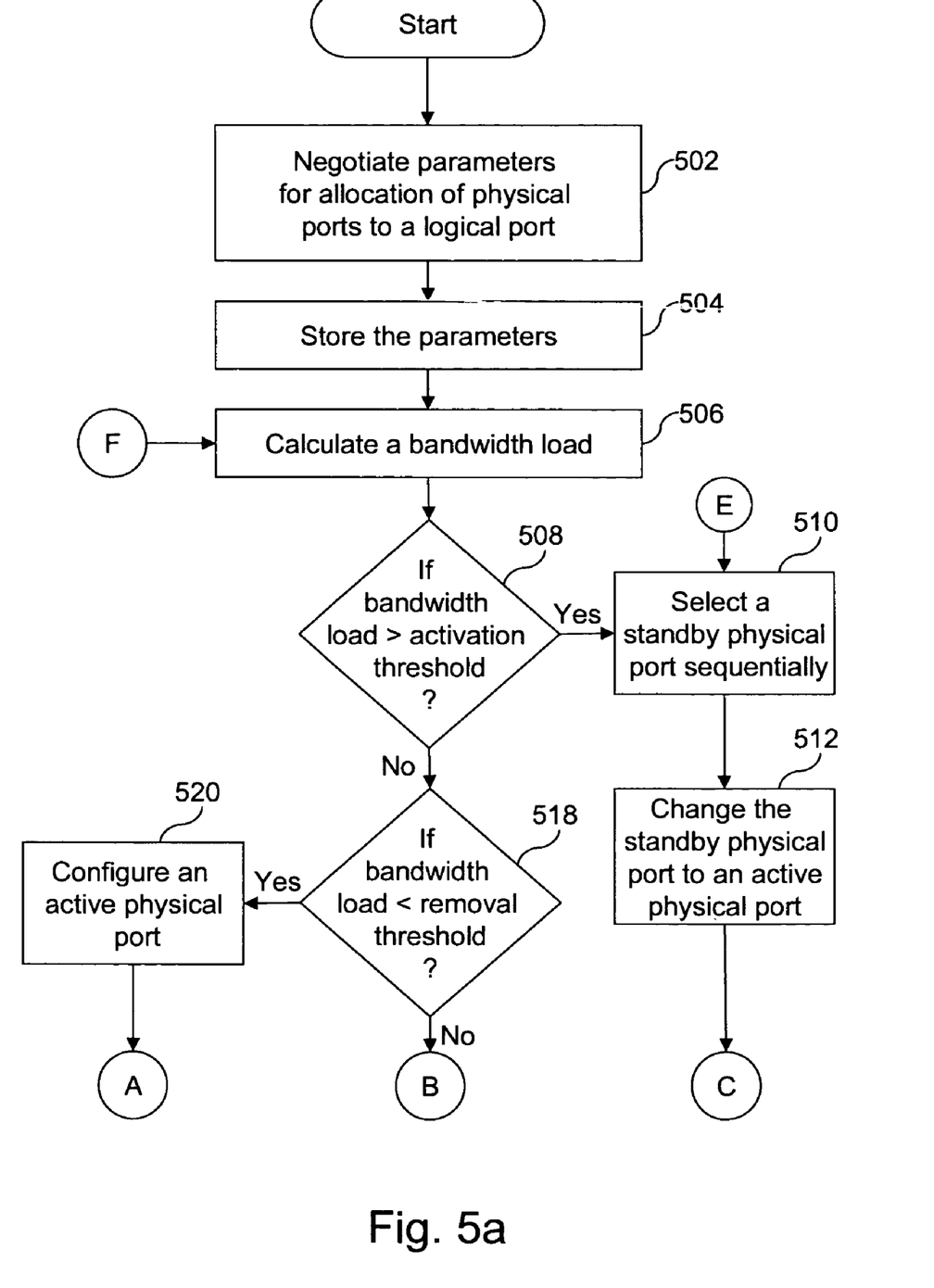
FIGS. 5a and 5b are parts of a flowchart of a method for power-efficient configuration of physical ports in an EtherChannel, in accordance with another exemplary embodiment of the present invention.
Figure 5B:
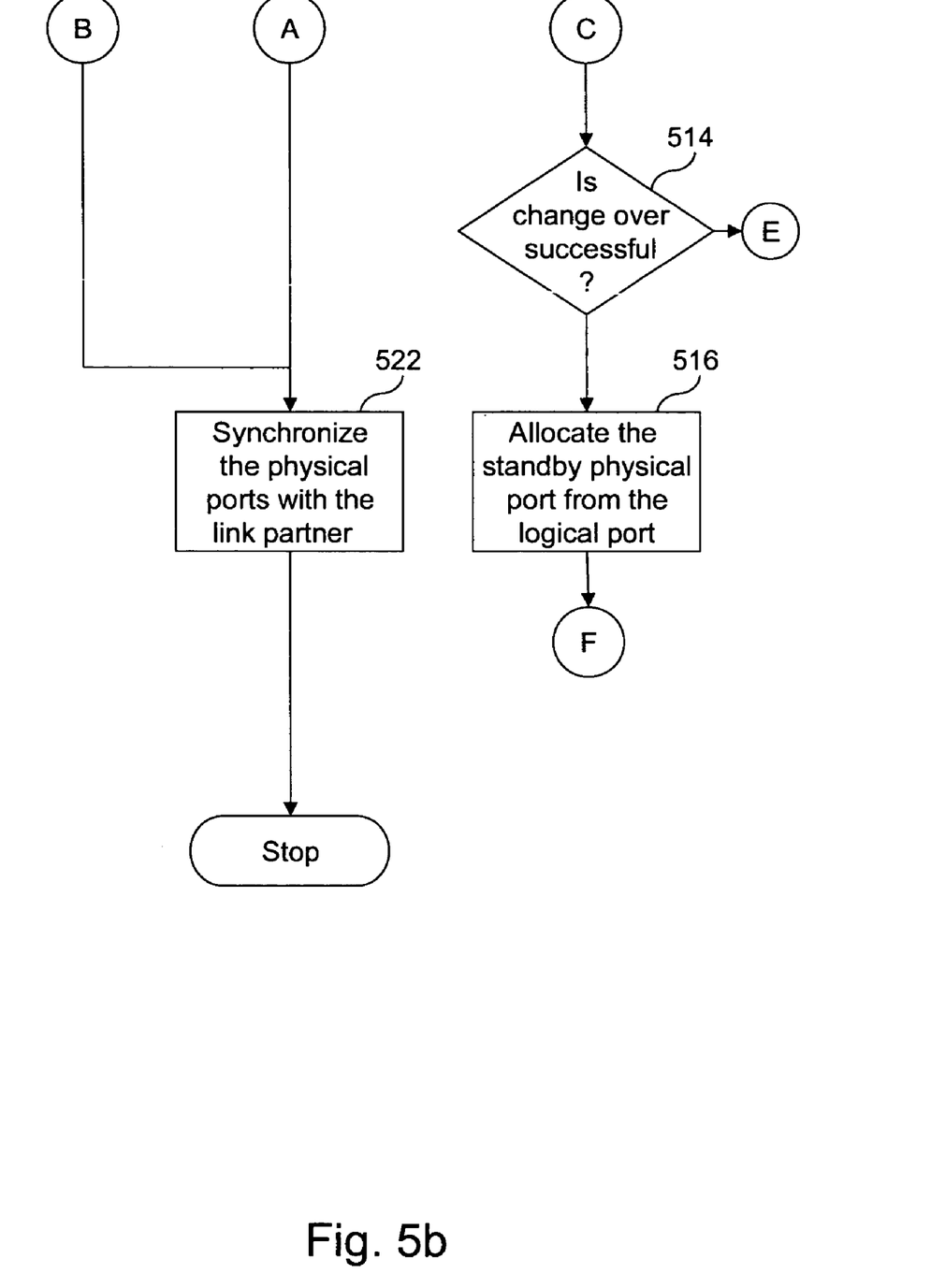

FIGS. 5a and 5b are parts of a flowchart of a method for power-efficient configuration of physical ports 208 in EtherChannel 104, in accordance with another exemplary embodiment of the present invention. At step 502, the parameters for allocation of physical ports 208 to the logical ports are negotiated at negotiating module 202. At step 504, the parameters are stored in memory buffer 302 of switch/link. At step 506, comparison module 204 calculates the bandwidth load at the logical port of switch 102a. In addition, stability of the bandwidth load is checked for the predefined hold-time. Checking the stability involves calculating the moving average of the bandwidth load for the predefined hold-time and using the moving average for comparison. In an embodiment of the present invention, checking the stability involves ensuring that the bandwidth load is above the activation threshold or below the removal threshold for the predefined hold-time. Checking the stability helps in reducing port thrashing due to a sudden inflow of data packets. Thereafter, at step 508, the bandwidth load is compared with activation threshold at comparison module 204. At step 510, one or more of standby physical ports 314 are selected if the bandwidth load is greater than the activation threshold. The selection is based on the sequence that has been negotiated by switch 102a and link partner 102b. The sequence for selecting physical ports 208 includes a sequence for converting standby physical ports 314 to active physical ports 312 and another sequence for converting active physical ports 312 to standby physical ports 314. At step 512, the one or more selected standby physical ports are converted to active physical ports 312 by enabling the power to the selected standby physical ports. At step 514, the activation of the selected standby physical ports is checked for failure. A verification data packet is sent to link partner 102b from the selected standby physical ports. Thereafter, a confirmation data packet is received from link partner 102b as a response if the selected standby physical ports are capable of data transmission. Standby physical ports 314 activation failure is detected when the confirmation data packet is not received till an on-time. Therefore, if the selected standby physical ports are found activated at step 514, the selected standby physical ports are allocated to the logical port, at step 516. Thereafter, the bandwidth load is calculated again at step 506. Further, the process is repeated from step 508. However, at step 514, if activation of the selected physical ports fails, then steps 510, 512 and 514 are repeated. The repetition of steps 510, 512 and 514 is terminated if more standby physical ports 314 are not available for selection at step 510.

At step 508, if bandwidth load is less than the activation threshold, the bandwidth load is compared with the removal threshold at step 518. If the bandwidth load is less than the removal threshold at step 518, one or more of active physical ports 312 are configured at step 520. The configuring of active physical ports 312 is described in detail in conjunction with FIGS. 6a and 6b. Thereafter, at step 522, physical ports 208 at switch 102a are synchronized with link partner 102b. The synchronization includes synchronizing the sequence for selecting one or more physical ports from physical ports 208 at switch 102a with link partner 102b.

Figure 6A:
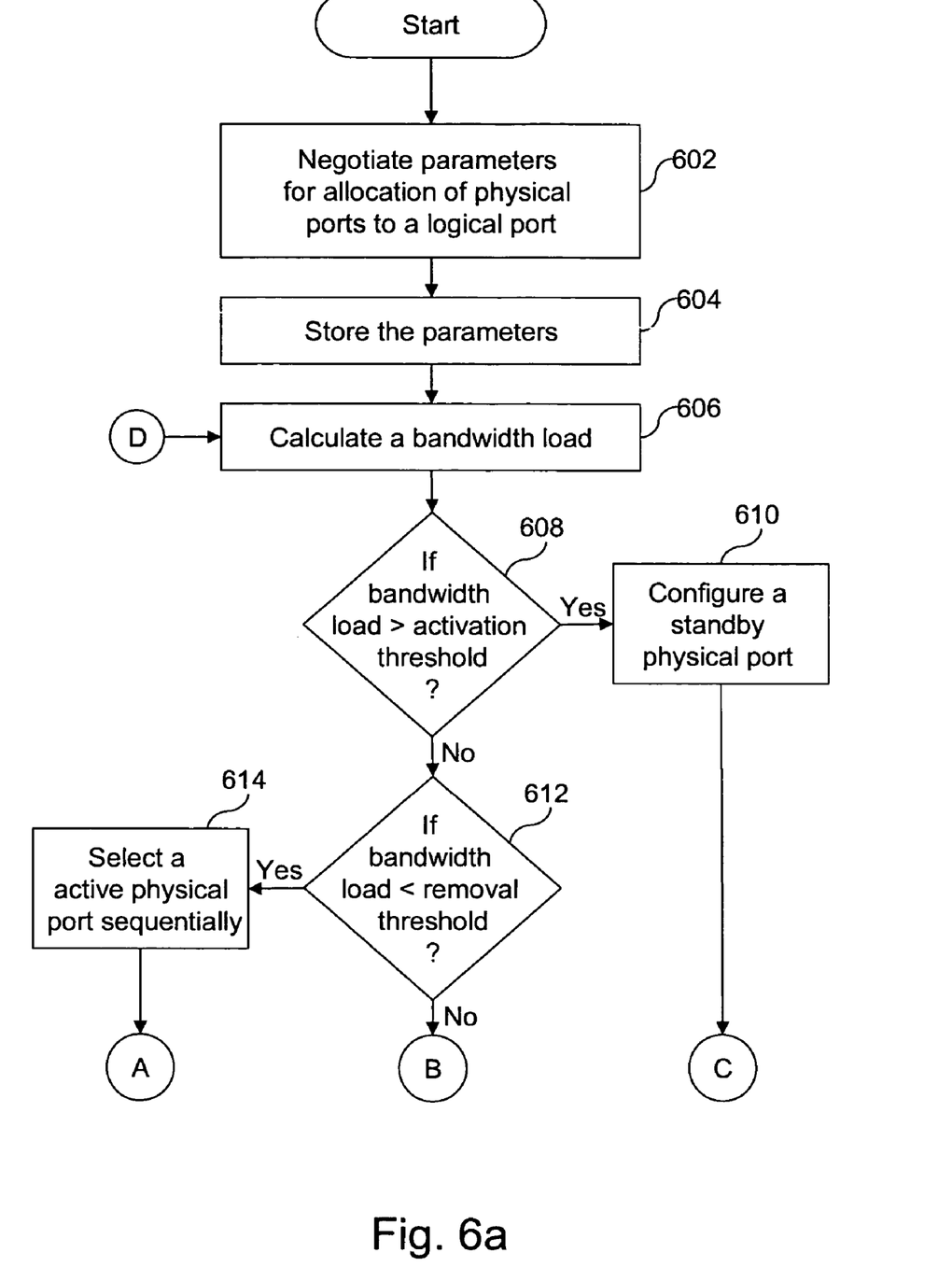
FIGS. 6a and 6b are parts of a flowchart of a method for power-efficient configuration of physical ports in an EtherChannel, in accordance with yet another exemplary embodiment of the present invention.
Figure 6B:
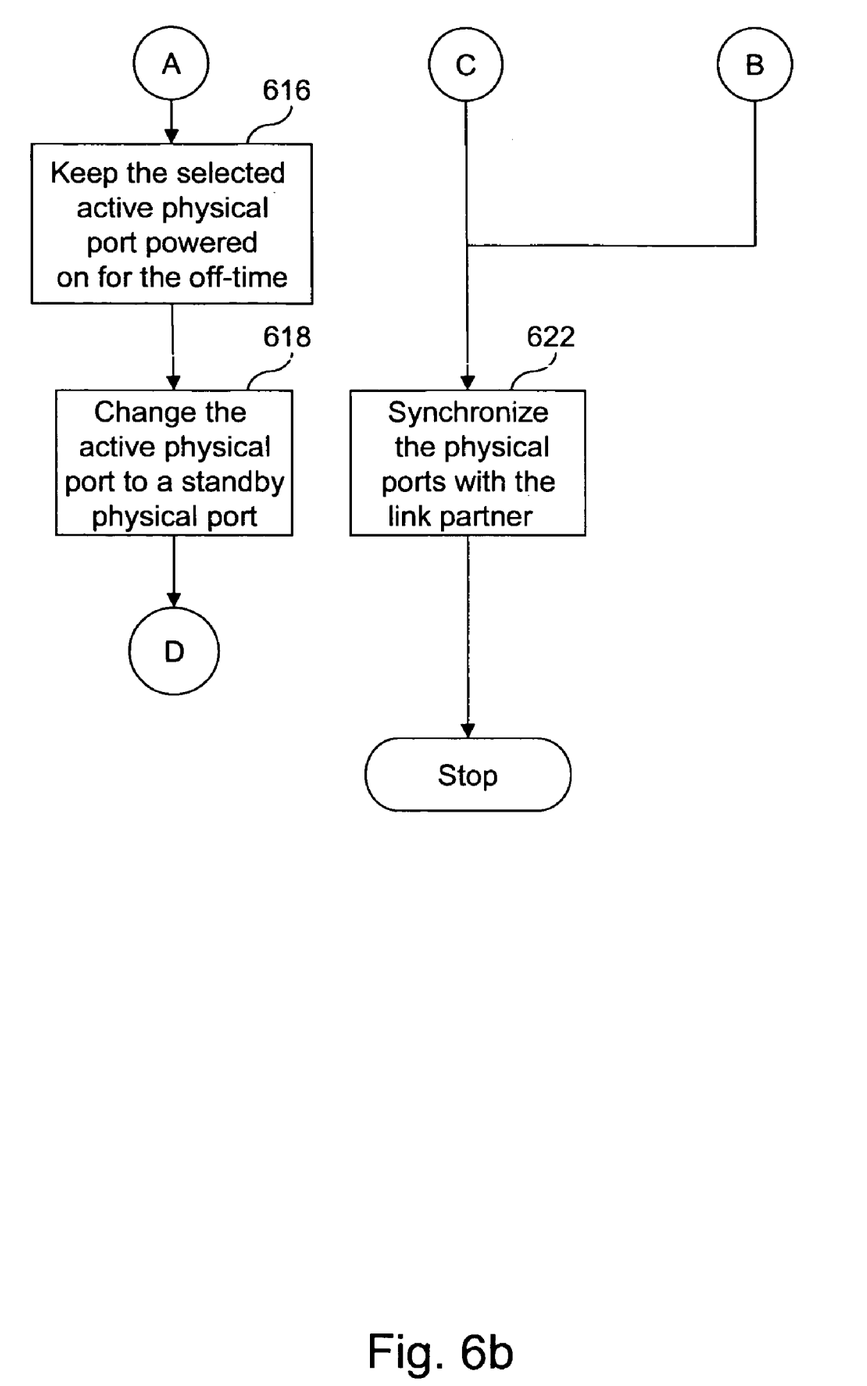

FIGS. 6a and 6b are flowcharts of a method for power-efficient configuration of physical ports 208 in an EtherChannel, in accordance with yet another exemplary embodiment of the present invention. At step 602, parameters are negotiated at negotiating module 202 for allocation of physical ports 208 to logical ports. At step 604, the parameters are stored in memory buffer 302. At step 606, comparison module 204 calculates the bandwidth load at the logical port. Further, stability of the bandwidth load is also checked for the predefined hold time. Checking the stability of the bandwidth helps in reducing port thrashing due to a sudden burst of data packets. Thereafter, at step 608, the bandwidth load is compared with activation threshold at comparison module 204. One or more of standby physical ports 314 are configured at step 610, if the bandwidth load is greater than the activation threshold. The step of configuring of standby physical ports 314 is described in detail in conjunction with FIGS. 5a and 5b. Thereafter, at step 620, physical ports 208 at switch 102a are synchronized with link partner 102b. However, at step 608, if the bandwidth load is less than the activation threshold, the bandwidth load is compared with the removal threshold at step 612. At step 612, if the bandwidth load is less than the removal threshold, one or more of the active physical ports 312 are selected at step 614. The selection is based on the sequence that has been negotiated by switch 102a and link partner 102b. At step 616, the selected active physical ports are kept powered on for the incoming data packets from link partner 102b to be received at switch 102a for the off-time. Clock module 308 keeps track of the off-time. At step 618, the one or more selected active physical ports are converted to standby physical ports 314. The conversion is achieved by removing the selected active physical ports from the logical port and disabling hardware linked to the selected active physical port. In an embodiment of the present invention, the selected active physical ports are converted to standby physical ports 314 by switching off the power to the selected active physical ports. Thereafter, the bandwidth load is calculated again at step 606. Further, the process is repeated from step 608.

In a preferred embodiment of the present invention, at least two of physical ports 208 are kept in an active state even if the bandwidth load is less than the removal threshold. This is done to preserve redundancy at low bandwidth load conditions.

In preferred embodiment of the present invention, physical ports 208 are by default in standby mode when the system is first powered up. The physical ports 208 are powered down in the standby mode.

In an embodiment of the present invention, the method can be implemented along with the existing protocols as Cisco's Port Aggregation Protocol (PAgP), IEEE 802.3ad Link Aggregation Control Protocol (LACP) and so forth. The implementation involves enhancements to the existing protocols. In an embodiment of the present invention, the enhancements include introducing new flag bits for enabling power-efficient mode and additional variables for holding power-efficient mode specific information, such as activation threshold, deactivation threshold, on-time, off-time, and standby sequence. Extensions to the existing negotiation protocol data units (PDUs) should be added to accommodate power-efficient parameter exchange. Enumerations and other structures should also be defined as required, to implement the power-efficient mode.

According to an embodiment of the present invention, a method for power-efficient configuration of one or more physical ports at a switch in an EtherChannel is provided. The method comprises negotiating parameters for the allocation of the physical ports to a logical port, wherein the parameters are negotiated with a link partner; comparing the bandwidth load at the logical port with the parameters; and configuring the physical ports based on the comparison.

In another embodiment of the invention, a method for power-efficient configuration of one or more physical ports at a network device in an EtherChannel is provided. The method comprises negotiating parameters for allocation of the physical ports to a logical port, wherein the parameters are negotiated with a link partner; comparing bandwidth load at the logical port with the parameters; changing a standby physical port to an active physical port if the bandwidth load is greater than the activation threshold; changing the active physical ports to standby physical port if the bandwidth load is lesser than the removal threshold; allocating the active physical ports to the logical port; and removing the standby physical ports from the logical port.

In yet another embodiment of the invention, a system for power-efficient configuration of one or more physical ports in an EtherChannel is provided. The system comprises a link partner; a network device connected to the link partner by the EtherChannel, the network device comprises means for negotiating parameters for allocation of the physical ports to a logical port, wherein the parameters are negotiated with a link partner; means for comparing bandwidth load at the logical port with the parameter; and means for configuring the physical ports based on the comparison.

In other embodiments, an apparatus for power-efficient organization of one or more physical ports into a logical port is provided. The apparatus comprises a processor for executing instructions and a machine-readable medium that includes instructions executable by the processor. The instruction enables the apparatus to negotiate parameters for allocation of the physical ports to a logical port, wherein the parameters are negotiated with a link partner; to compare bandwidth load at the logical port with the parameters; and to configure the physical ports based on the comparison.

Various embodiments of the invention provide a machine-readable medium that includes instructions executable by a computer processor. One or more of these instructions negotiate parameters for allocation of the physical ports to a logical port, wherein the parameters are negotiated with a link partner. Other instructions compare bandwidth load at the logical port with the parameter. Still other instructions for configuring the physical ports based on the comparison.

Embodiments of the present invention provide a method and system for an adaptive configuration of the physical ports at a network device, based on the bandwidth load to minimize the power consumption. The embodiments of the present invention also provide method and system for preventing frequent activation, deactivation of the ports due to sudden burst in network load. In an embodiment of the present invention, method for port failure detection is also provided. Embodiments of the present invention provide power saving and cost saving in case of switches, routers, hubs, and servers used in data networks. Embodiments of the present invention can also be used at places where heat generation is a major problem.

Although the invention has been discussed with respect to specific embodiments thereof, these embodiments are merely illustrative, and not restrictive, of the invention. For example, a 'method for power-efficient configuration of one or more physical ports in an EtherChannel' can include any type of analysis, manual or automatic, to anticipate the needs of configuration.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification may contain material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method comprising:
    negotiating parameters for allocation of one or more physical ports to a logical port, the one or more physical ports being at a network device in a data transmission channel, wherein the parameters are negotiated with a link partner, wherein the link partner is a second network device, wherein the parameters for allocation include an activation threshold for converting a standby physical port to an active physical port, and wherein the activation threshold is a percentage of the total bandwidth load for the logical port;
    comparing a bandwidth load at the logical port with the parameters, wherein the parameters are received from the link partner; and
    configuring the physical ports based on the comparison.

2. The method of claim 1, wherein the data transmission channel is an Etherchannel.

3. The method of claim 1, wherein the link partner comprises:
    one or more active physical ports allocated to the logical port; and
    one or more standby physical ports.

4. The method of claim 3, wherein the parameters for allocation further comprise a removal threshold for converting the active physical port to the standby physical port.

5. The method of claim 1, wherein the parameters for allocation further comprise a sequence for selecting a physical port for the conversion.

6. The method of claim 1, wherein configuring the physical ports comprises:

changing a standby physical port to an active physical port if the bandwidth load is greater than an activation threshold;
changing the active physical ports to standby physical port if the bandwidth load is lesser than a removal threshold;
allocating the active physical port to the logical port; and
removing the standby physical port from the logical port.

7. The method of claim 6, wherein configuring the physical ports further comprises checking that the number of active physical ports in the logical port is greater than two.

8. The method of claim 6, further comprising sequentially activating another standby physical port if the standby physical port fails to change over to the active physical port in a predefined on-time.

9. The method of claim 6, further comprising removing active physical port after a pre-defined off-time, wherein the off-time is for receiving incoming data packets from the link partner at the network device.

10. The method of claim 1, further comprising holding the comparison of the physical ports for a predefined hold time.

11. The method of claim 1, further comprising calculating the bandwidth load periodically.

12. The method of claim 1, further comprising storing the parameters for allocation before the comparison.

13. The method of claim 1, further comprising synchronizing the configuration of the physical ports at the network device with the physical ports at the link partner.

14. A method comprising:
negotiating parameters for allocation of one or more physical ports to a logical port, the one or more physical ports being at a network device in a data transmission channel, wherein the parameters are negotiated with a link partner, and wherein the link partner is a second network device;
comparing bandwidth load at the logical port with the parameters, wherein the parameters are received from the link partner;
changing a standby physical port to an active physical port if the bandwidth load is greater than an activation threshold;
changing the active physical port to standby physical port if the bandwidth load is lesser than the removal threshold, wherein the physical ports are placed in a default standby mode upon applying power to the second network device;
allocating the active physical ports to the logical port; and
removing the standby physical ports from the logical port.

15. A system comprising:
a link partner, wherein the link partner is a network device; and
a second network device connected to the link partner by the data transmission channel, the second network device comprising:
means for negotiating parameters for allocation of one or more physical ports to a logical port, the one or more physical ports being at a network device in a data transmission channel, wherein the parameters are negotiated with a link partner, and wherein the physical ports are placed in a default standby mode upon applying power to the second network device;
means for comparing the bandwidth load at the logical port with the parameters, wherein the parameters are received from the link partner; and
means for configuring the physical ports based on the comparison.

16. The system of claim 15, wherein the link partner comprises:
one or more active physical ports allocated to the logical port; and
one or more standby physical ports.

17. The system of claim 15, wherein the means for configuring the physical ports comprises:
means for changing the standby physical port to active physical port if the bandwidth load is greater than an activation threshold;
means for changing the active physical ports to standby physical port if the bandwidth load is lesser than a removal threshold;
means for allocating the active physical ports to the logical port; and
means for removing the standby physical ports from the logical port.

18. The system of claim 15, further comprising a clock module, the clock module comprising:
an up timer, the up timer activating another standby physical port if the standby physical port fails to become active in an up time; and
a down timer, the down timer removing another active physical port if the active physical port is not removed in a down time.

19. The system of claim 15, further comprising a memory buffer storing the parameters for allocation before the comparison.

20. The system of claim 15, wherein the link partner is a switch.

21. An apparatus for power efficient organization of one or more physical ports into a logical port, the apparatus comprising:
a processor; and
a machine-readable medium including instructions executable by the processor comprising:
one or more instructions for negotiating parameters for allocation of the physical ports to a logical port, wherein the parameters are negotiated with a link partner, wherein the link partner is a second network device, wherein the parameters for allocation include an activation threshold for converting a standby physical port to an active physical port, and wherein the activation threshold is a percentage of the total bandwidth load for the logical port;
one or more instructions for comparing bandwidth load at the logical port with the parameters, wherein the parameters are received from the link partner; and
one or more instructions for configuring the physical ports based on the comparison.

22. A machine-readable medium including instructions executable by a processor, machine-readable medium comprising:
one or more instructions for negotiating parameters for allocation of the physical ports to a logical port, wherein the parameters are negotiated with a link partner, wherein the link partner is a second network device, wherein the parameters for allocation include an activation threshold for converting a standby physical port to an active physical port, and wherein the activation threshold is a percentage of the total bandwidth load for the logical port;
one or more instructions for comparing bandwidth load at the logical port with the parameters, wherein the parameters are received from the link partner; and
one or morn instructions for configuring the physical ports based on the comparison.

* * * * *